United States Patent
Molina et al.

(10) Patent No.: US 8,520,715 B2
(45) Date of Patent: Aug. 27, 2013

(54) ADAPTATIVE MULTI-CARRIER CODE DIVISION MULTIPLE ACCESS

(75) Inventors: Jose Abad Molina, Barcelona (ES); Juan Carlos Riveiro Insua, Barcelona (ES); Jonathan Ephraim David Hurwitz, Edinburgh (GB)

(73) Assignee: Broadcom Corporation, Irvine, CA (US)

( * ) Notice: Subject to any disclaimer, the term of this patent is extended or adjusted under 35 U.S.C. 154(b) by 559 days.

(21) Appl. No.: 12/771,805

(22) Filed: Apr. 30, 2010

(65) Prior Publication Data

US 2010/0265992 A1    Oct. 21, 2010

Related U.S. Application Data

(63) Continuation-in-part of application No. 11/482,373, filed on Jul. 6, 2006, now Pat. No. 7,860,146.

(51) Int. Cl.
*H04B 1/00* (2006.01)
*H04B 7/216* (2006.01)
*H04W 4/00* (2009.01)

(52) U.S. Cl.
USPC ........... 375/130; 375/260; 370/332; 370/335; 370/342

(58) Field of Classification Search
USPC .................. 375/130, 260; 370/335, 342, 432
See application file for complete search history.

(56) References Cited

U.S. PATENT DOCUMENTS

| | | | | |
|---|---|---|---|---|
| 7,269,403 | B1* | 9/2007 | Miao | 455/402 |
| 2003/0203721 | A1* | 10/2003 | Berezdivin et al. | 455/126 |
| 2005/0031047 | A1* | 2/2005 | Maltsev et al. | 375/260 |
| 2005/0141473 | A1* | 6/2005 | Lim et al. | 370/342 |
| 2005/0157670 | A1* | 7/2005 | Tang et al. | 370/320 |
| 2005/0190826 | A1* | 9/2005 | Van Bruyssel et al. | 375/222 |
| 2006/0258316 | A1* | 11/2006 | Lei et al. | 455/296 |

OTHER PUBLICATIONS

Tang, C.; Stolpman, V.J.; , "Multiple users adaptive modulation schemes for MC-CDMA," Global Telecommunications Conference, 2004. GLOBECOM '04. IEEE , vol. 6, No., pp. 3823-3827 vol. 6, Nov. 29-Dec. 3, 2004.*

* cited by examiner

*Primary Examiner* — Daniel Washburn
*Assistant Examiner* — Eboni Hughes
(74) *Attorney, Agent, or Firm* — Garlick & Markison; Bruce E. Garlick

(57) ABSTRACT

A system for performing adaptive multi-carrier code division multiple access (AMC-CDMA) is provided. The system determines a channel performance metric for each of a plurality of carriers and then determines at least one AMC-CDMA parameter for each of the carriers based on the channel performance metric. Modulator circuitry then modulates the signal on each carrier using the specified AMC-CDMA parameters for transmission over a wired connection.

20 Claims, 5 Drawing Sheets

ADAPTATIVE MULTI-CARRIER CODE DIVISION MULTIPLE ACCESS

CROSS-REFERENCE TO RELATED APPLICATIONS

This application is a Continuation-in-part of U.S. patent application Ser. No. 11/482,373, entitled "Adaptative Multi-Carrier Code Division Multiple Access," filed Jul. 6, 2006 now U.S. Pat. No. 7,860,146 which is incorporated herein by reference.

BACKGROUND

1. Technical Field

The present invention relates generally to communication signal processing and more particularly to systems and methods for adaptative multi-carrier code division multiple access modulation.

2. Description of Related Art

Code Division Multiple Access (CDMA) encodes data with a special code. CDMA provides greater capacity and security in a variety of communications systems such as radio systems, networking systems, and wireless communications systems. One limitation with CDMA is the difficulty in achieving high performance due to channel impairments. Orthogonal Frequency Division Multiplexing (OFDM) splits a data stream into a number of lower rate streams that are each transmitted simultaneously over carrier frequencies that are orthogonal to one another.

OFDM has been used in residential power line communications and in Asymmetric Digital Subscriber Line communications. One example of a power line communication system using OFDM uses a large number of carriers that is greater than 1000 to achieve 200 Mbps. Because of the large number of carriers, the OFDM communication system has a high peak-to-average ratio. This OFDM communication system is robust against delay spread (cyclic prefix) and has high throughput. One limitation with OFDM is the high cost to achieve this high throughput. This example of a residential power line communication system uses a 2-30 MHz band that has a high delay spread and is regulated for injection of high power spectral density (PSD). With a high PSD, dynamic notches or power suppression are typically implemented to avoid interferences over amateur radio communications. In this example, there is high spectral efficiency but increasing performance such as beyond 9 bit/Hz increases costs.

Combining the OFDM with the CDMA results in Multi-Carrier Code Division Multiple Access (MC-CDMA). In MC-CDMA, each symbol is spread over multiple carriers with a special code, or each symbol is spread over the same carrier over time. One limitation is that high performance cannot be achieved due to channel impairments.

SUMMARY OF THE INVENTION

The invention addresses the above problems by performing adaptative multi-carrier code division multiple access. A system for performing adaptative multi-carrier code division multiple access (AMC-CDMA) includes first circuitry and modulator circuitry. The first circuitry determines a channel performance metric for each of a plurality of carriers. The first circuitry determines at least one AMC-CDMA parameter for each of the carriers based on the channel performance metric. The modulator circuitry modulates AMC-CDMA signals using the at least one AMC-CDMA parameter in each of the carriers for transmission over a wired connection.

The AMC-CDMA parameters may be a number of code division multiple access sequences over a carrier, a length of a code division multiple access sequence, a length of a chip in a code division multiple access sequence, and a number of bits per symbol or constellation size of the modulation. Some examples of the channel performance metric are signal-to-noise ratio and bit error rate. The wired connection may be a power line connection, where the frequencies of the AMC-CDMA signals are above 30 MHz.

A method for performing AMC-CDMA includes the steps of determining a channel performance metric for each of a plurality of carriers and determining at least one AMC-CDMA parameter for each of the carriers based on the channel performance metric. The method also includes modulating AMC-CDMA signals using the parameters for each of the carriers and transmitting the AMC-CDMA signals over a wired connection.

In various embodiments, a system comprises a serial to parallel converter, a modulator, a PN generator configured to generate PN sequences, and a summarizer. The serial to parallel converter is configured to receive a bit stream and a number of CDMA sequences per each carrier. The total number of CDMA sequences is equal or greater than a number of a plurality of carriers that will subsequently be used to transmit the bit stream. The serial to parallel converter is configured to divide the bit stream over the total number of CDMA sequences to produce the same number of virtual carrier signals. The modulator is configured to modulate each virtual carrier signal, of the number of virtual carrier signals, to produce the same number of modulated virtual carrier signals. For each carrier of the plurality of carriers, the summarizer is configured to add modified virtual carrier signals, where each modified virtual carrier signal is the product of one of the virtual carrier signals and a PN sequence. The system can also comprise an IFFT configured to receive from the summarizer, for each carrier of the plurality of carriers, the sum of the modified virtual carrier signals for that carrier. The IFFT is further configured to perform an inverse fast Fourier transform function on each sum.

The system can also comprise a bit loading memory that stores AMC-CDMA parameters used by the serial to parallel converter, the modulator, the PN generator, and the summarizer. The serial to parallel converter can thus be configured to receive the number of CDMA sequences from the bit loading memory, and the modulator can be configured to receive an input for each virtual carrier signal from the bit loading memory for modulating that virtual carrier signal. The input for each virtual carrier signal can specify a number of bits per symbol or a constellation size of the modulation. The summarizer can also be configured to receive an input that specifies the number of sequences per carrier, and in these embodiments the input specifies a length of each CDMA sequence per carrier and/or a chip length of each CDMA sequence per carrier.

In various embodiments, a method comprises dividing a bit stream into a number of virtual carrier signals and modulating each of the virtual carrier signals. The method additionally comprises combining the modulated virtual carrier signals to produce an $X_N(u)$ signal for each carrier of a number of carriers, where the number of carriers is less or equal than the number of virtual carrier signals, and the carriers will be subsequently used to transmit the bit stream. The method further comprises performing an inverse fast Fourier transform function on the XN(u) signals to produce a digital signal.

In various embodiments, the method further comprises determining a channel performance metric for each carrier of the number of carriers, and determining a number of CDMA sequences over each carrier. Here, determining the number of CDMA sequences over each carrier is based on the channel performance metric for each carrier. The method further comprises, before dividing the bit stream, determining the number of virtual carrier signals by summing the number of CDMA sequences over the number of carriers. In some of these embodiments determining the channel performance metric for each carrier of the number of carriers is performed by a first node, while dividing the bit stream is performed by a second node in communication with the first node. Some of these embodiments further comprise determining a number of bits per symbol, or a constellation size, of the modulation for each of the CDMA sequences, and in these embodiments modulating each of the virtual carrier signals employs the determined number of bits or constellation size.

One advantage is that the AMC-CDMA provides adaptive modulation for multiple network nodes according to the channel quality. Another advantage is the low implementation cost of AMC-CDMA based on increasing the number of CDMA sequences but not the number of FFT points (that correspond to the OFDM carriers).

DETAILED DESCRIPTION OF THE INVENTION

Figure 1:
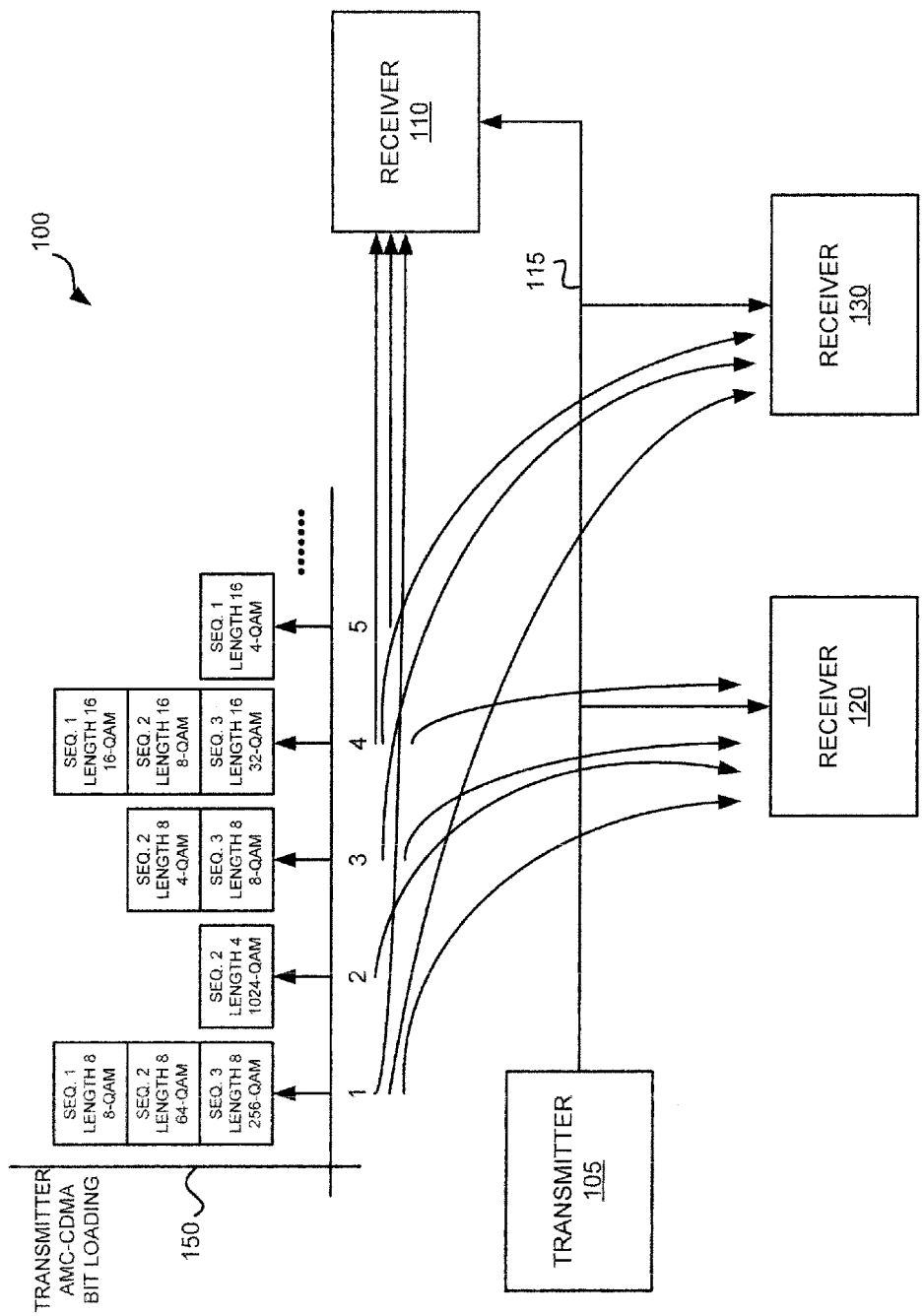
FIG. 1 is an illustration of a communication system in an embodiment of the invention.

The embodiments discussed herein are illustrative of one example of the present invention. As these embodiments of the present invention are described with reference to illustrations, various modifications or adaptations of the methods and/or specific structures described may become apparent to those skilled in the art. All such modifications, adaptations, or variations that rely upon the teachings of the present invention, and through which these teachings have advanced the art, are considered to be within the scope of the present invention. Hence, these descriptions and drawings should not be considered in a limiting sense, as it is understood that the present invention is in no way limited to only the embodiments illustrated.

A "band" is defined herein as the range of frequencies that the multi-carrier CDMA signal occupies in the spectrum, from the lowest frequency carrying data to the highest frequency carrying data. Each band comprises a plurality of carriers. In a multi-carrier CDMA modulation, each frequency point that corresponds to each of the FFT points used to build the OFDM symbol is a "carrier." Additionally, the term "channel" will be used herein to refer to the physical medium that connects a transmitter and a receiver.

A system for performing adaptative multi-carrier code division multiple access (AMC-CDMA) includes first circuitry and modulator circuitry. The first circuitry determines a channel performance metric for each of a plurality of carriers. The first circuitry determines at least one AMC-CDMA parameter for each of the carriers based on the channel performance metric. The modulator circuitry modulates AMC-CDMA signals using the AMC-CDMA parameters in each of the carriers for transmission over a wired connection.

Adaptative Multi Carrier Code Division Multiple Access (AMC-CDMA) is modulation of multi-carriers using CDMA that applies different AMC-CDMA parameters in each carrier according to channel performance metrics of the carrier. One example of a channel performance metric is SNR. CDMA is used to modulate and multiplex a different number of bits per each carrier instead of only using standard modulation such as M-QAM and M-DPSK.

One advantage is that the AMC-CDMA provides adaptive modulation for multiple network nodes according to the channel quality. Another advantage is the low implementation cost of AMC-CDMA based on increasing the number of CDMA sequences but not the number of FFT points. Some other advantages are the low Power Spectral Density (PSD) from spread spectrum systems and the robustness against frequency selective channels from OFDM modulations.

AMC-CDMA also allows several users at the same time by advantageously using different carriers and allows the use of the same carriers with different CDMA sequences. By multiplexing several users at the same time, every user is either using different carriers in frequency or in sequence, having a different set of sequences per each user. In multipoint to multipoint applications, allowing several users at the same time can be important, where the latency is an important factor from the application and cost point of view. This advantage may be especially important in power line communications where the network topologies can be mesh/adhoc networks (where every node can be a repeater).

FIG. 1 depicts an illustration of a communication system 100 in an embodiment of the invention. The communication system 100 includes a transmitter 105, a receiver 110, a receiver 120, and a receiver 130. The transmitter 105 is coupled to the receiver 110, the receiver 120, and the receiver 130 by power grid channel 115.

The transmitter 200 of FIG. 2 and the receiver 300 of FIG. 3, discussed in greater detail below, provide exemplary embodiments of the transmitter 105 and the receivers 110, 120, and 130 of FIG. 1. It will be appreciated that the transmitter 200 of FIG. 2 and the receiver 300 of FIG. 3 show only certain components for modulation and that other conventional components have been omitted for clarity. For simplicity, FIG. 1 illustrates a network having one transmitter 105 and multiple receivers 110, 120, 130, but other networks of the invention can comprise multiple transmitters 105 with multiple receivers (e.g., 110). Further networks of the invention can comprise one or more transceivers configured to both transmit and receive.

FIG. 1 depicts one example of communications in a residential power line communication system. In this example, the residential power line communication system operates in two frequency bands. A first low band operates in the frequency range of 2 MHz to 30 MHz. This low band is regulated by Electromagnetic Compatibility (EMC) regulations for power lines. The second band comprises a non-regulated frequency band at least partially, or entirely, above 30 MHz, except as may be subject to general EMC regulations. One advantage of this non-regulated high band is the ability to allow for low power spectral density. In this example, the AMC-CDMA is used in the high band. In this high band, the AMC-CDMA modulation is used to transmit high data rate over a power line, while minimizing the injected power and maximizing the data rate. By using a non-regulated band for power line communications, the transmission levels allowed in this non-regulated band are much lower than in the regulated band. Other embodiments may employ AMC-CDMA in bands other than just the high, non-regulated band. Furthermore, other embodiments may employ AMC-CDMA in other wired and/or wireless communications systems besides power line communications. One example of a wired communications system includes coaxial connections.

The transmitter 105 is any device or system configured to encode signals by AMC-CDMA and transmit those signals. One example of the transmitter 105 is discussed in more detail below in FIG. 2. The receivers 110, 120, and 130 are any devices or systems configured to receive signals and decode the signals by AMC-CDMA. One example of the receivers 110, 120, 130 is discussed in more detail below in FIG. 3.

Graph 150 represents carriers and sequences in the bit loading of the AMC-CDMA signal. Sequences 1, 2, and 3 from carrier 1 are respectively used in communications with the receiver 110, the receiver 120, and the receiver 130. Sequence 2 from carrier 2 is used in communications with the receiver 120. Sequences 2 and 3 from carrier 3 are respectively used in communications with the receiver 120 and the receiver 130. Sequences 1, 2, and 3 from carrier 4 are respectively used in communications with the receiver 110, the receiver 120, and the receiver 130. Sequence 1 from carrier 5 is used in communications with the receiver 110. Other CDMA sequences and carriers are not shown for the sake of simplicity.

The graph 150 depicts the AMC-CDMA parameters that can be changed to optimize communications between the transmitter 110 and the receivers 120, 130, and 140. The first parameter is a number of bits per symbol or constellation size of the modulation, such as the selection of a QAM constellation size. For example, in carrier 1, sequence 1 has a modulation of 8-QAM, sequence 2 has a modulation of 64-QAM, and sequence 3 has a modulation of 256-QAM. It will be understood that although FIG. 1 shows that for any given carrier each sequence has a different number of bits, this is not a requirement and multiple sequences over the same carrier can also have the same number of bits. Another parameter is the length of the CDMA sequence. The sequences 1-3 in carrier 1 have a length of 8, while the sequence 2 in carrier 2 has a length of 4. The sequences 1-3 in carrier 4 have a length of 16. Here, the sequence length is the same for each sequence over a carrier, and in some embodiments the sequence length is the same for the sequences over every carrier.

Figure 2:
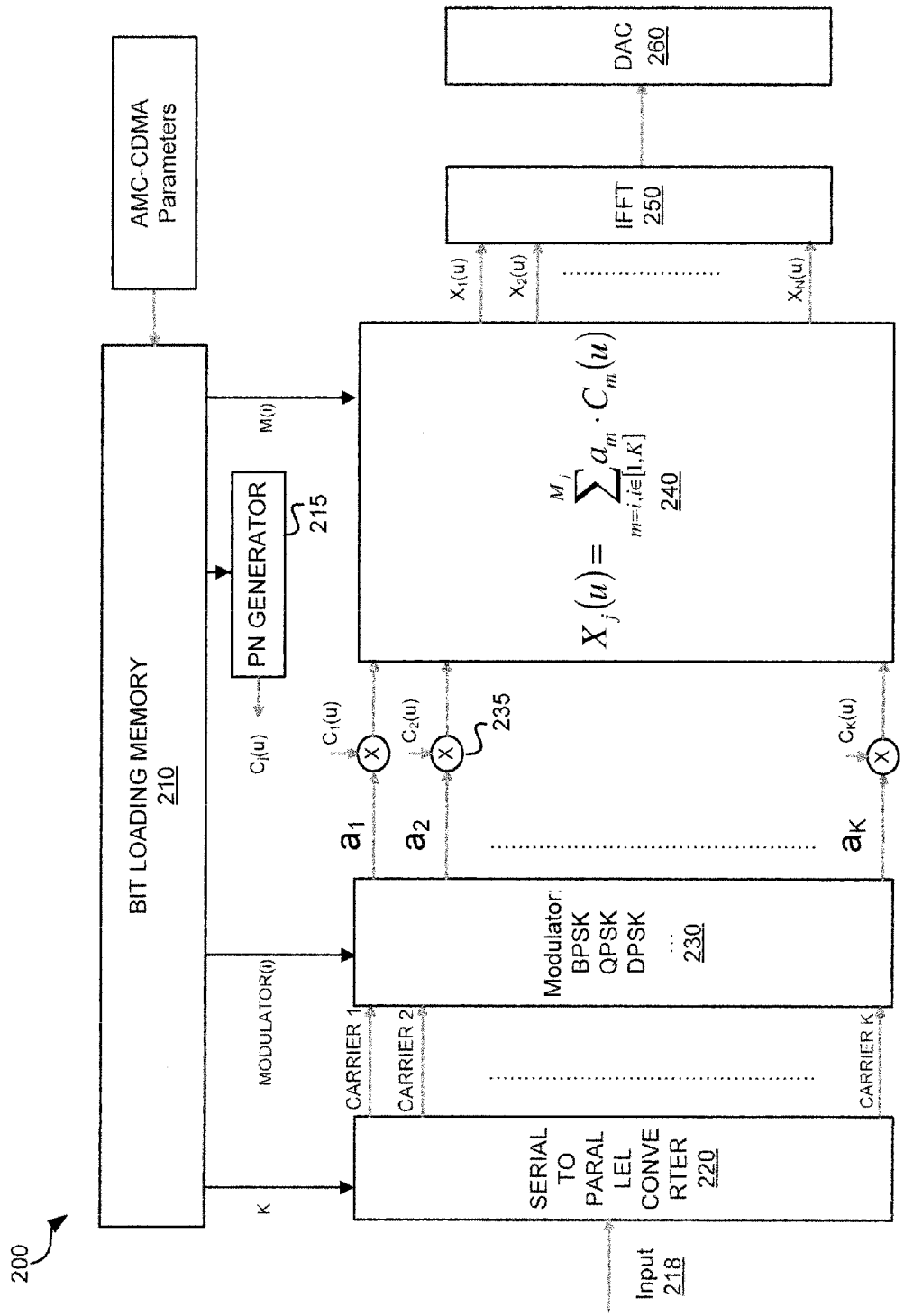
FIG. 2 is an illustration of a transmitter in an embodiment of the invention.
Figure 3:
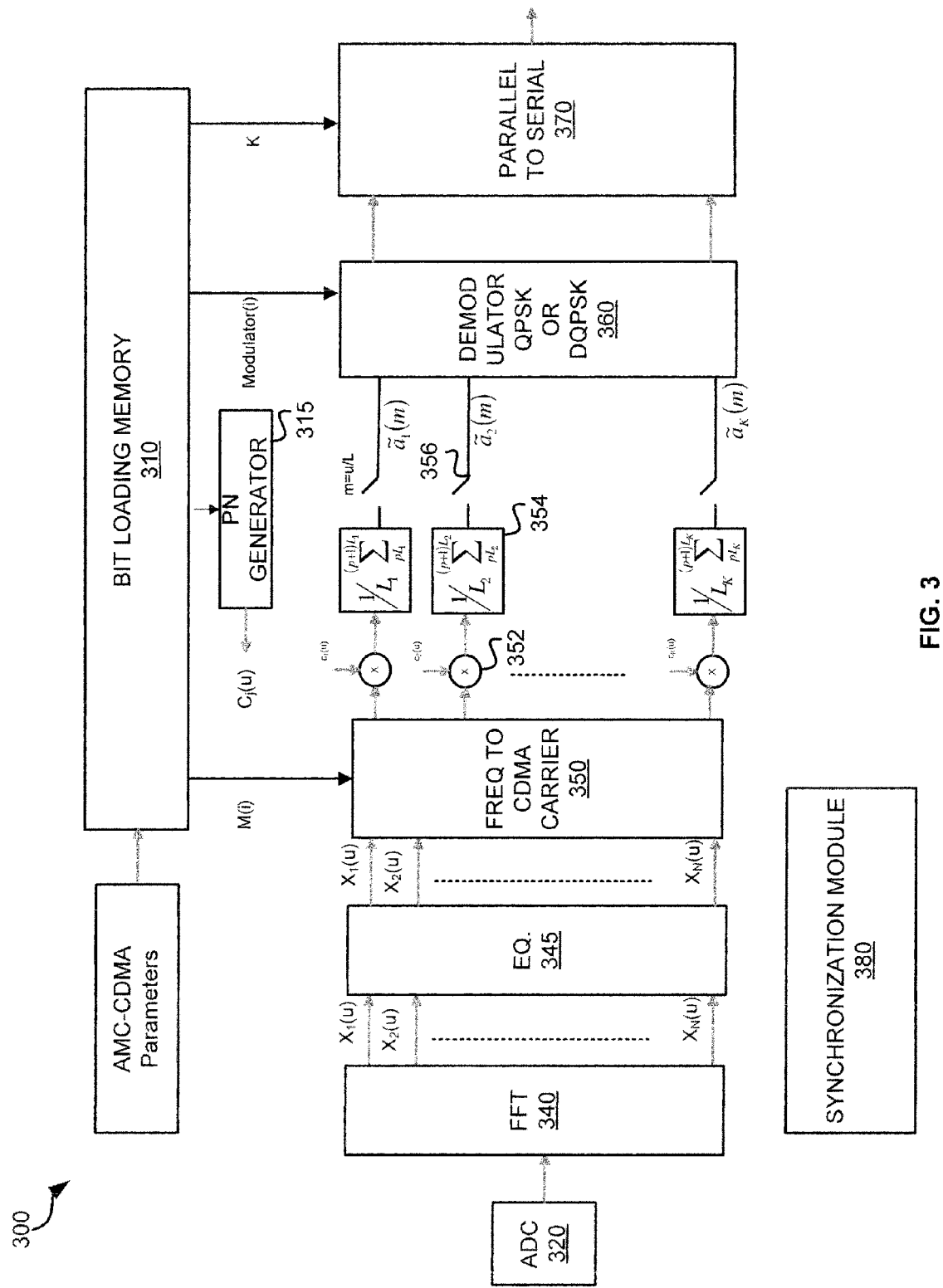
FIG. 3 is an illustration of a receiver in an embodiment of the invention.

FIG. 2 depicts an illustration of a transmitter 200 in an embodiment of the invention. The blocks of the transmitter 200 may represent functional blocks that can be implemented in circuitry such as digital signal processors and field programmable gate arrays, or alternatively, the blocks of the transmitter 200 may represent dedicated circuitry. The transmitter 200 includes a bit loading memory 210, a pseudo noise (PN) sequence generator 215, a serial to parallel converter 220, a modulator 230, multipliers 235, a summarizer 240, an inverse Fast Fourier Transform (IFFT) block 250, and a Digital to Analog Converter (DAC) 260.

The transmitter 200 provides adaptive CDMA modulation on top of each carrier. In order to adapt the transmission rate and modulation scheme to the channel conditions, the AMC-CDMA parameters for CDMA modulation can be changed based on the metrics of the channel's performance such as the Signal-to-Noise Ratio (SNR). The use of AMC-CDMA modulation increases immunity against delay spread and impulsive noise. AMC-CDMA modulation also allows multiple users simultaneously. The AMC-CDMA modulation uses a multi-carrier that applies different bit loadings over each carrier in an adaptive way.

The bit loading memory 210 provides parameters for the AMC-CDMA modulation. The bit loading memory 210 may store these parameters of the AMC-CDMA modulation. In some embodiments, circuitry (not shown) executing firmware determines a channel performance metric for each of the plurality of carriers by sending communications between the transmitter 200 and the receiver 300, as discussed below in FIG. 3. A channel performance metric is any measurement or value that is indicative of the operation, quality, condition, or status of a channel. Some examples of channel performance metrics are SNR, bit error rates, attenuation measurements, and other noise measurements. In some embodiments, the channel performance metrics comprise the SNRs of every carrier. The circuitry also determines at least one AMC-CDMA parameter for each of the carriers based on the measured channel performance metric for that carrier. The parameters can then be stored in the bit loading memory 210, as provided above.

An AMC-CDMA parameter is any number or value that indicates how a bit of data is loaded in communications. In this example, the four adaptive AMC-CDMA parameters are the number of CDMA sequences over the same carrier, the length of the CDMA sequence, the number of bits per symbol or constellation size, and the length of the chip in a CDMA sequence. Varying these AMC-CDMA parameters can increase the throughput of each carrier. Some of these parameters may change with changing channel conditions while other parameters may not change.

The first AMC-CDMA parameter is the number of CDMA sequences per carrier. Each CDMA sequence is the result of the modulation of n-bits of information by one CDMA sequence. In every carrier, it can be multiplexed as a maximum (i.e. to maintain orthogonality among all sequences) M-CDMA sequence, where M is the result of $2^L$ and L is the CDMA sequence length or the number of multi-carrier symbols that are included in the CDMA sequence. Generally, a higher SNR permits a greater number of CDMA sequences per carrier. Increasing the number of CDMA sequences increases the number of bits loaded over the carriers but not the number of FFT points, which advantageously provides a low implementation cost of AMC-CDMA. Thus, AMC-CDMA provides a low cost implementation of a multi-carrier system with a variable number of sequences. The equation below is for the final number of sequences, K:

$$K = \sum_{j=1}^{N} M_j$$

$M_j$ is the number of CDMA sequences that the carrier j is transmitting at the same time. Therefore, the system is able to change the total number of sequences according to the SNR of the channel.

The second parameter is the length of the CDMA sequence. Changing the length of the CDMA sequence improves robustness versus noise. This parameter can change the modulation in real time to adapt the transmitter 200 to the channel's performance. The time to transmit data and the latency increase, while the processing gain of the system also increases. Thus, the spreading factor (which is the length) of the CDMA sequence can increase, which increases the robustness versus noise and channel delay spread or inter-symbol interference (ISI). Increasing the lengths of the sequences also increases the granularity for the number of sequences values, thereby increasing the granularity in throughput.

The third parameter is the number of bits per symbol of each constellation. By varying the three parameters, the transmitter 200 using AMC-CDMA can adapt by increasing or decreasing the latency or overhead and the throughput according to the channel conditions. Thus, AMC-CDMA can provide a multi-carrier system with a high number of sequences but with an implementation cost corresponding to one with a much lower number of carriers. One possible constraint may be that the robustness versus ISI/delay spread of the channel may be mainly limited by the number of the core multi-carrier modulation. However, CDMA sequences help to reduce the impact of the ISI.

A fourth parameter is the length of the chip in the CDMA sequence. When all the chips have the same length, and the length of the chip is 1, one of the chips of the CDMA in one OFDM symbol is transmitted. The chip length can be varied in integer numbers in order to achieve more robustness against the delay spread and other channel impairments, where the chip of the CDMA is shared during several OFDM symbols. This parameters may be chosen independently for every carrier (FFT frequency point).

The following equation is for bits/carrier:

$$\text{Bits/carrier} = n*M/(L*\text{chiplength})$$

where n is the constellation number of bits;
M is the number of CDMA sequences over the same carrier;
L is length of the CDMA sequence; and
chiplength is the length of the CDMA chip.

In operation, the serial to parallel converter 220 receives an incoming bit stream over link 218 from a forward error correction encoder (not shown). The bit stream is from a single user but can include data intended for multiple independent destinations. In some embodiments, the bit stream comprises a gigabit per second bit stream. The serial to parallel converter 220 also receives the number of sequences, K, from the bit loading memory 210. The number of sequences, K, that is stored in the bit loading memory 210 is calculated based on the number of CDMA sequences per carrier and the number of carriers, according to the formula given above, and is therefore greater than the number of carriers. The serial to parallel converter 220 divides the bit stream into K groups to produce K virtual carrier signals. For each carrier there is the same number of virtual carrier signals as the number of CDMA sequences for that carrier. In one example, the number of carriers is 250, spread over 200 MHz. This example also has a low constellation size. This example advantageously is robust against the delay spread, has a relatively low peak-to-average ratio (PAR), and has low complexity for an analog front end and a digital front end.

The modulator 230 then modulates the virtual carrier signals associated to carrier i based on the Modulator(i) input for that carrier i to result in the modulated carrier signals, $a_k$. Each $a_k$ signal is a point in the constellation. The Modulator(i) input indicates the constellation size to be employed for each carrier. Some examples of the modulation schemes for different constellation sizes are Binary Phase Shifting Key (BPSK), Quaternary Phase Shift Keying (QPSK), Differential Phase Shift Keying (DPSK) and all Quadrature Amplitude Modulation schemes, like 8-QAM, 16-QAM, 64-QAM, 256-QAM. In some embodiments, the modulator 230 modulates the virtual carrier signals sequentially, but other embodiments can include a plurality of modulators 230 in parallel.

The PN generator 215 generates the PN sequences, $C_j(u)$. Each multiplier 235 multiplies the modulated virtual carrier signal $a_k$ with the PN sequence $C_k(u)$ to produce a dot product. The summarizer 240 sums up the dot products of the modulated virtual carrier signals, $a_k$ and the PN sequences, $C_k(u)$ based on the M(i) input for carrier i. The summarizer 240 groups the virtual carriers for each carrier i. The M(i) input includes the number of CDMA sequences for carrier i, and in various embodiments can also include the sequence length and/or the chip length. The summarizer 240 generates the $X_N(u)$ signals for the carriers. It should be noted that the multiplier 235 is optional in some embodiments. Specifically, where the values of the sequences are only +1 and −1, instead of using multiplier 235 the sign is either maintained or reversed.

The IFFT 250 then performs an inverse fast Fourier transform function on the $X_N(u)$ to change from the frequency domain to the time domain. A cyclic prefix insertion block (not shown) may then append the IFFT output, such as from 0 to 1 µs, to the resulting signal. The resulting signal can then be converted with a digital to analog converter 260. The cyclic prefix or guard period may also be not included in the transmitter 200. In other embodiments, FFT can be used to implement the multicarrier modulation on top of the AMC-CDMA. CORDIC may also be used instead of FFT to modulate and demodulate each carrier individually.

One advantage of this embodiment in FIG. 2 is that 1 Gbps is easy to achieve with 200 MHz and up to 5 bits/Hz. Another advantage is the low complexity of the CDMA (only need to multiply by 1 or −1) and the FFT due to the small number of carriers and low number of bits and operations. A further advantage is the low peak-to-average ratio that requires a low number of bits in the ADC and DAC converters. Also, the transmitter 200 can work below 0 dB of the SNR with a processing gain of more than 10 dB.

As a particular example, a network comprises three nodes in communication over a wired connection. One node can transmit independently and simultaneously to the other two nodes within a band from 50 MHz to 300 MHz. The band is divided into 256 carriers, spaced approximately 1 MHz apart. The transmitting node can employ a number of CDMA sequences, between 1 and 32, for each carrier, and can further employ a sequence length between 4 and 32 OFDM symbols that is common to each of the CDMA sequences. The transmitting node can further employ a different M-QAM constellation for each CDMA sequence for high speed communications.

FIG. 3 depicts an illustration of a receiver 300 in an embodiment of the invention. The blocks of the receiver 300 may represent functional blocks that can be implemented in circuitry such as digital signal processors and field programmable gate arrays, or alternatively, the blocks of the receiver 300 may represent dedicated circuitry. The receiver 300 includes a bit loading memory 310, a pseudo noise (PN) generator 315, an analog to digital converter (ADC) 320, a fast Fourier transform (FFT) 340, an equalizer 345, a frequency to CDMA carrier converter 350, a multiplier 352, summarizers 354, switches 356, a demodulator 360, a parallel to serial converter 370, and a synchronization module 380.

The ADC 320 receives an incoming signal from the transmitter 200 of FIG. 2. The incoming signal from the channel is first synchronized, and then the channel response is estimated over each carrier. The ADC 320 performs an analog to digital conversion on the incoming signal. A cyclic prefix removing block (not shown) may then remove the cyclic prefix from the signal. The FFT 340 then performs a fast Fourier transform on the signal resulting in $X_N(u)$ signals. The equalizer 345 uses the estimated channel response over each carrier to equalize the $X_N(u)$ signals. The frequency to CDMA carrier converter 350 converts the $X_N(u)$ signals per each carrier from carriers to virtual carrier signals based on the number of sequences for carrier i indicated by the M(i) input.

The PN generator 315 generates the PN sequences, $C_j(u)$. The multipliers 352 multiply the carrier signals from the converter 350 with the PN sequences, $C_j(u)$. The summarizer 354 performs a calculation of $$\frac{1}{L_K} \sum_{pL_K}^{(p+1)L_K}.$$

The switch 356 switches the signal resulting in signal $ã_K(m)$. The demodulator 360 then demodulates the signals $ã_K(m)$ based on the input Modulator(i). Some examples of demodulation use BPSK, QPSK, Differential Quadrature Phase Shift Keying (DQPSK), and QAM constellations. The demodulated data is used in a block (not shown) to determine one or more channel performance metrics of the channel, such as SNR, for every carrier. The channel performance metrics are used to determine the AMC-CDMA parameters in another block (not shown), and those variables can be transmitted back to the transmitter 200. The parallel to serial converter 370 then performs a parallel to serial conversion on the demodulated data. The synchronization module 380 performs synchronization functions to ensure synchronicity with a clock for the receiver 300 and with the starting point in time of the received data frame.

In the above description the receiver 300 uses the incoming analog signal to determine channel performance metrics and from the metrics determine the AMC-CDMA parameters. The AMC-CDMA parameters are stored in the bit loading memory 310 of the receiver 300 and transmitted back to the transmitter 200 where they are stored in the bit loading memory 210. In other embodiments, however, there is no feedback from the receiver 300 and the transmitter 200 is configured to determine the channel performance metrics and the AMC-CDMA parameters.

Figure 4:
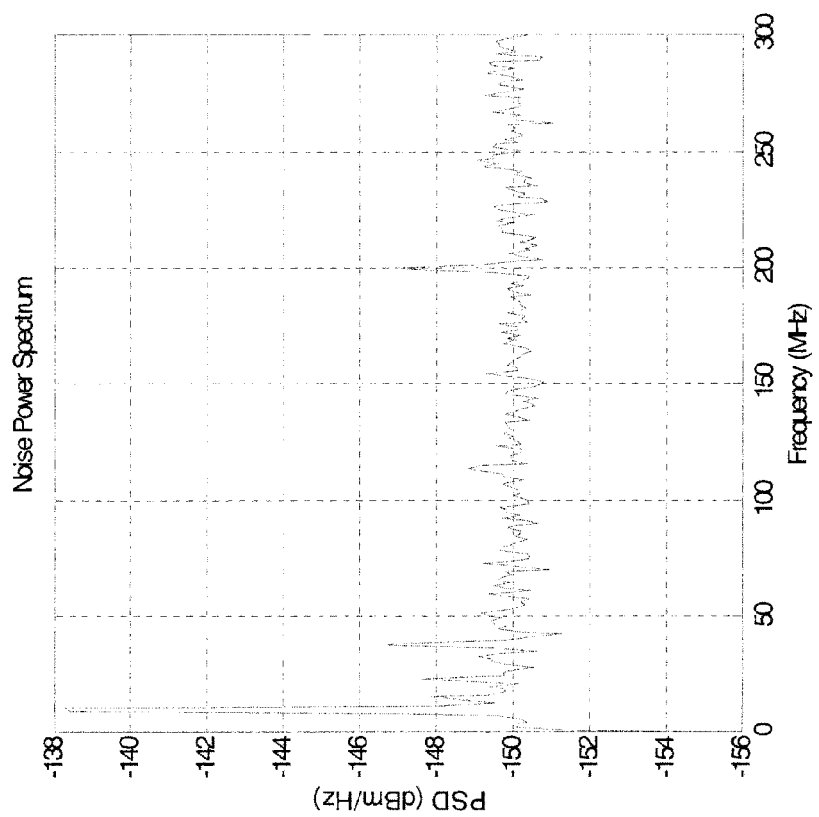
FIG. 4 is a noise power spectrum graph of frequency (in MHz) vs. Power Spectral Density (PSD) (in dBm/Hz) from an embodiment of the invention.

FIG. 4 depicts a noise power spectrum graph of frequency (in MHz) vs. Power Spectral Density (PSD) (in dBm/Hz) from an embodiment of the invention. FIG. 4 depicts low noise for a channel operating under good conditions.

Figure 5:
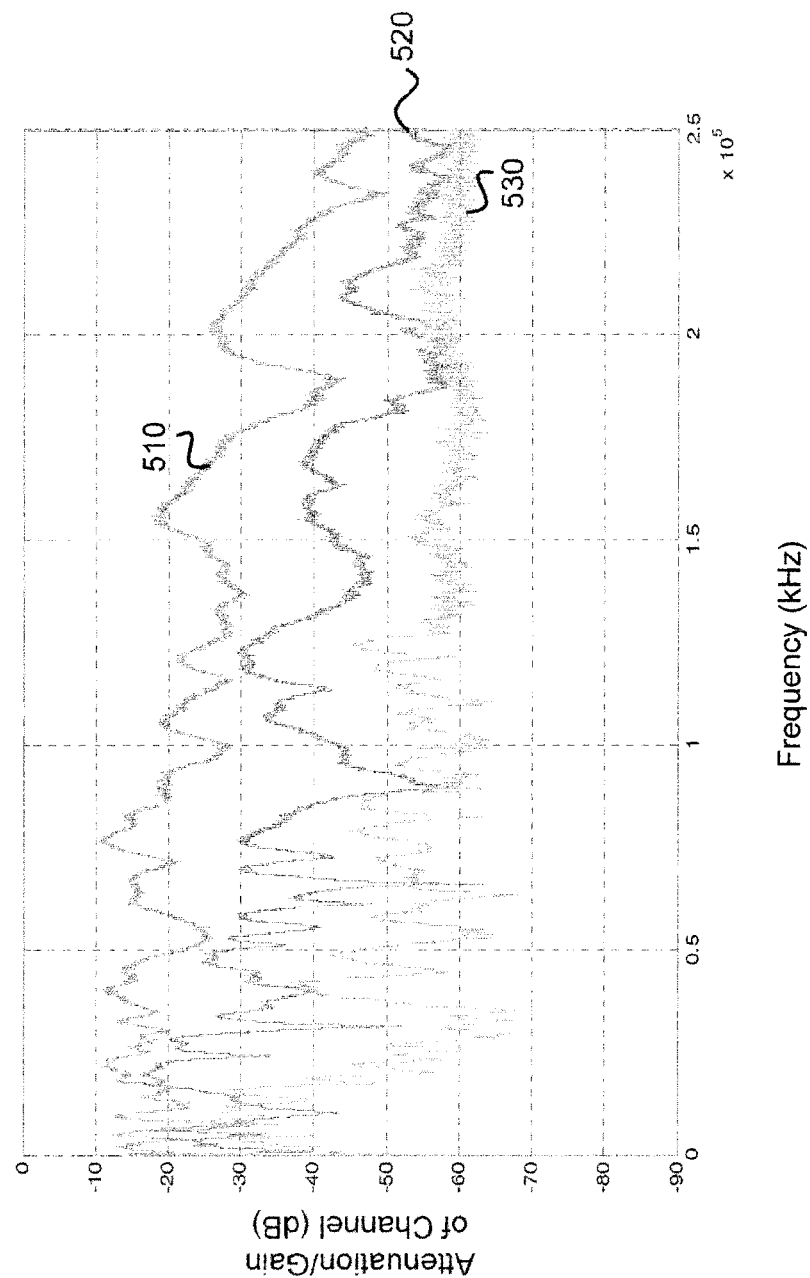
FIG. 5 is a channel response graph from an embodiment of the invention.

FIG. 5 depicts a channel frequency response graph of attenuation (in dB) vs. frequency (in kHz) from an embodiment of the invention. The graph in FIG. 5 depicts a line 510 representing a channel under good conditions, a line 520 representing a channel under average conditions, and a line 530 representing a channel under bad conditions. FIGS. 4 and 5 can assist with calculations of signal to noise ratios for channels, which can be used for determining the AMC-CDMA parameters.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A system comprising:
a serial to parallel converter configured to
receive a bit stream and a number of CDMA sequences, the number of CDMA sequences being equal or greater than a number of a plurality of carriers, and
divide the bit stream over the number of CDMA sequences to produce the same number of virtual carrier signals;
a modulator configured to modulate each virtual carrier signal of the number of virtual carrier signals to produce the same number of modulated virtual carrier signals;
a PN generator configured to generate PN sequences; and
a summarizer configured to receive an input that specifies a number o f CDMA sequences per carrier and a length of each CDMA sequence per carrier, to add modified virtual carrier signals for each carrier of the plurality of carriers, each modified virtual carrier signal being the product of one of the virtual carrier signals and a PN sequence.

2. The system of claim 1 wherein the modulator modulates each virtual carrier signal according to an input for that virtual carrier signal.

3. The system of claim 1 further comprising a bit loading memory, wherein
the serial to parallel converter is configured to receive the number of CDMA sequences from the bit loading memory, and
the modulator is configured to receive an input for each virtual carrier signal from the bit loading memory for modulating that virtual carrier signal.

4. The system of claim 1 wherein the input for each virtual carrier signal specifies a number of bits per symbol or a constellation size of the modulation.

5. The system of claim 1 further comprising an IFFT configured to
receive from the summarizer, for each carrier of the plurality of carriers, the sum of the modified virtual carrier signals for that carrier, and
perform an inverse fast Fourier transform function on each sum.

6. The system of claim 1 wherein the input further specifies a chip length of each CDMA sequence per carrier.

7. The system of claim 1, further comprising circuitry configured to transmit the plurality of carriers on a wired media.

8. The system of claim 1, further comprising circuitry configured to wirelessly transmit the plurality of carriers.

9. A method performed by a first node in a communication system, the method comprising:
receiving a channel performance metric for each carrier of a number of carriers from a second node in the communication system;
determining a number of CDMA sequences over each carrier based on the channel performance metric for each carrier;
determining a number of virtual carrier signals by summing the number of CDMA sequences over the number of carriers;
dividing a bit stream into a number of virtual carrier signals;
modulating each of the virtual carrier signals;
combining the modulated virtual carrier signals to produce an XN(u) signal for each carrier of a number of carriers, the number of carriers being less or equal than the number of virtual carrier signals; and
performing an inverse fast Fourier transform function on the XN(u) signals to produce a digital signal.

10. The method of claim 9 further comprising determining a number of bits per symbol or a constellation size of the modulation for each of the CDMA sequences, wherein modulating each of the virtual carrier signals employs the determined number of bits or constellation size.

11. The method of claim 9 further comprising determining a length of each CDMA sequence per carrier based on the channel performance metric for that carrier.

12. The method of claim 9 further comprising determining a chip length of each CDMA sequence per carrier based on the channel performance metric for that carrier.

13. The method of claim 9, further comprising:
converting the digital signal into an analog signal; and
transmitting the analog signal on a wired media.

14. The method of claim 9, further comprising:
converting the digital signal into a Radio Frequency analog signal; and
wirelessly transmitting the Radio Frequency analog signal.

15. A system comprising:
a serial to parallel converter configured to
receive a bit stream and a number of CDMA sequences, the number of CDMA sequences being equal or greater than a number of a plurality of carriers, and
divide the bit stream over the number of CDMA sequences to produce the same number of virtual carrier signals;
a modulator configured to modulate each virtual carrier signal of the number of virtual carrier signals to produce the same number of modulated virtual carrier signals;
a PN generator configured to generate PN sequences;
a summarizer configured to receive an input that specifies a number of CDMA sequences per carrier and a length of each CDMA sequence per carrier, to add modified virtual carrier signals for each carrier of the plurality of carriers, each modified virtual carrier signal being the product of one of the virtual carrier signals and a PN sequence;
an IFFT configured to receive from the summarizer, for each carrier of the plurality of carriers, the sum of the modified virtual carrier signals for that carrier, and perform an inverse fast Fourier transform function on each sum to produce an IFFT output;
Digital to Analog conversion circuitry operable to convert the IFFT output to a transmit signal.

16. The system of claim 15 wherein the modulator modulates each virtual carrier signal according to an input for that virtual carrier signal.

17. The system of claim 15 further comprising a bit loading memory, wherein
the serial to parallel converter is configured to receive the number of CDMA sequences from the bit loading memory, and
the modulator is configured to receive an input for each virtual carrier signal from the bit loading memory for modulating that virtual carrier signal.

18. The system of claim 15 wherein the input for each virtual carrier signal specifies a number of bits per symbol or a constellation size of the modulation.

19. The system of claim 15 further comprising an IFFT configured to
receive from the summarizer, for each carrier of the plurality of carriers, the sum of the modified virtual carrier signals for that carrier, and
perform an inverse fast Fourier transform function on each sum.

20. The system of claim 15 wherein the input further specifies a chip length of each CDMA sequence per carrier.

* * * * *

UNITED STATES PATENT AND TRADEMARK OFFICE
CERTIFICATE OF CORRECTION

PATENT NO.        : 8,520,715 B2                                    Page 1 of 1
APPLICATION NO.   : 12/771805
DATED             : August 27, 2013
INVENTOR(S)       : Jose Abad Molina et al.

It is certified that error appears in the above-identified patent and that said Letters Patent is hereby corrected as shown below:

In the Claims:

Col. 9, line 67, in claim 1: after "configured to" insert --:--
Col. 10, line 22, in claim 3: after "memory, wherein" insert --:--
Col. 10, line 33, in claim 5: after "figured to" insert --:--
Col. 10, line 62, in claim 9: replace "less or equal than" with --less than or equal to--
Col. 11, line 19, in claim 15: after "converter configured to" insert --:--
Col. 11, line 21, in claim 15: after "sequences being equal" insert --to--
Col. 12, line 14, in claim 17: after "memory, wherein" insert --:--
Col. 12, line 25, in claim 19: after "configured to" insert --:--

Signed and Sealed this
Second Day of September, 2014

Michelle K. Lee
*Deputy Director of the United States Patent and Trademark Office*